US008050278B2

(12) United States Patent
Jeffrey et al.

(10) Patent No.: US 8,050,278 B2
(45) Date of Patent: *Nov. 1, 2011

(54) METHOD AND SYSTEM FOR COMMUNICATING WITH A VIRTUAL CIRCUIT NETWORK

(75) Inventors: Mark T. Jeffrey, Berkshire (GB); Mark R. Sestak, Kirland, WA (US); Timothy M. Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1311 days.

This patent is subject to a terminal disclaimer.

(21) Appl. No.: 11/067,017

(22) Filed: Feb. 28, 2005

(65) Prior Publication Data

US 2005/0141512 A1 Jun. 30, 2005

Related U.S. Application Data

(63) Continuation of application No. 09/459,670, filed on Dec. 13, 1999, now Pat. No. 6,862,285.

(51) Int. Cl.
*H04L 12/28* (2006.01)

(52) U.S. Cl. ............... 370/395.3; 370/395.31; 370/466; 370/467

(58) Field of Classification Search ............... 370/395.1, 370/395.3, 397, 399, 230, 465, 395.2, 395.21, 370/395.31, 466, 467
See application file for complete search history.

(56) References Cited

U.S. PATENT DOCUMENTS

| 5,394,402 | A | | 2/1995 | Ross |
| 5,457,681 | A | | 10/1995 | Gaddis et al. |
| 5,548,589 | A | * | 8/1996 | Jeon et al. ..................... 370/399 |
| 5,581,552 | A | | 12/1996 | Civanlar et al. |
| 5,633,869 | A | * | 5/1997 | Burnett et al. ................ 370/396 |
| 5,752,003 | A | | 5/1998 | Hart |
| 5,818,842 | A | | 10/1998 | Burwell et al. |
| 5,943,337 | A | | 8/1999 | Sasagawa |
| 5,995,487 | A | | 11/1999 | Weaver et al. |
| 6,016,319 | A | * | 1/2000 | Kshirsagar et al. ........... 370/410 |
| 6,028,862 | A | * | 2/2000 | Russell et al. ................ 370/397 |
| 6,141,339 | A | | 10/2000 | Kaplan et al. |
| 6,163,541 | A | * | 12/2000 | Casey et al. .............. 370/395.51 |
| 6,182,193 | B1 | | 1/2001 | Hamami |
| 6,185,215 | B1 | | 2/2001 | Aho |
| 6,226,680 | B1 | | 5/2001 | Boucher et al. |
| 6,272,109 | B1 | * | 8/2001 | Pei et al. ....................... 370/230 |

(Continued)

OTHER PUBLICATIONS

Digital Technology, Inc. (DTI). *NDIS (Network Driver Interface Specification)* [web page] Jun. 7, 1998; http://www.whatis.com/ndis.htm. [Accessed Aug. 2, 1999].

(Continued)

*Primary Examiner* — Brian Nguyen
*Assistant Examiner* — Toan D Nguyen
(74) *Attorney, Agent, or Firm* — Wolf, Greenfield & Sacks, P.C.

(57) ABSTRACT

A host computer communicatively linked with a virtual circuit network and communicatively linked with a device over a local area network receives a virtual circuit message from the virtual circuit network, such as an asynchronous transfer mode network. A data structure associating a virtual circuit of the virtual circuit network with the device is referenced, and based on the association, the virtual circuit message is passed to the device over the local area network. The data structure may be a table containing an entry associating the virtual circuit with the device or with the network address of the device.

17 Claims, 3 Drawing Sheets

U.S. PATENT DOCUMENTS

| | | | |
|---|---|---|---|
| 6,324,166 B1 | 11/2001 | Yokoyama et al. | |
| 6,343,083 B1 * | 1/2002 | Mendelson et al. | 370/466 |
| 6,345,051 B1 * | 2/2002 | Gupta et al. | 370/395.2 |
| 6,490,622 B1 * | 12/2002 | Nagami et al. | 709/225 |
| 6,516,000 B1 * | 2/2003 | Kshirsagar et al. | 370/410 |
| 6,636,505 B1 * | 10/2003 | Wang et al. | 370/352 |
| 6,765,908 B1 * | 7/2004 | Chen | 370/392 |
| 2003/0043791 A1 | 3/2003 | Kato | |
| 2003/0200315 A1 | 10/2003 | Goldenberg et al. | |

OTHER PUBLICATIONS

Digital Technology, Inc. (DTI). *Network Driver Interface Specification (NDIS) and the Role of Digital Technology* [web page] Jun. 7, 1998. http://www.dtix.com/product/ndisdrv.html. [Accessed Aug. 2, 1999].

Microsoft Corporation. *NDIS Management Information and OIDs* [web page] Jul. 1, 1999. http://www.microsoft.com/DDK/DDKdocs/Win2kRC1/205mpinfo_13hj.htm. [Accessed Aug. 30, 1999].

Microsoft Corporation. *OIDs for Connection-Oriented Call Managers and Clients* [web page] Jul. 1, 1999. http://www.microsoft.com/DDK/DDKdocs/Win2kRC1/211cooid_74du.htm. [Accessed Aug. 30, 1999].

Microsoft Corporation. *Network OIDs* [web page] Jul. 1, 1999. http://www.microsoft.com/DDK/DDKdocs/Win2kRC1/201ndis_1mg7.htm. [Accessed Aug. 30, 1999].

Microsoft Corporation. *OID Overview* [web page] Jul. 1, 1999. http://www.microsoft.com/library/sdkdoc/crypto/usingcrypto_262f.htm. [Accessed Aug. 30, 1999 ].

Microsoft Corporation. *DSL Architecture Hardware White Paper* (Draft). Apr. 28, 1999.

Microsoft Corporation. *Remote NDIS and Windows Networking* [web page] Nov. 24, 1999. http://www.microsoft.com/hwdev/network/rmNDIS.htm. [Accessed Mar. 30, 2000].

Microsoft Corporation. *Introduction to DSL Architecture*—draft. [web page] Apr. 28, 1999. http://www.microsoft.com/hwdev/network/dsl/dslarch.htm. [Accessed May 4, 1999].

Microsoft Corporation. *NDIS 5.0 Extensions and ATM Support in Windows* [web page] Nov. 23, 1998. httn://www.microsoft.com/hwdev/devdes/ndis4_atm.htm. [Accessed May 4, 1999].

Microsoft Corporation. *Introduction to NDIS 5.0* [web page] Dec. 15, 1998. http://www.microsoft.com/hwdev/devdes/ndis5.htm. [Accessed May 4, 1999].

Ulyess Black;*ATM vol. 1, Foundation for Broadband Networks, Chapter 10: Call and Connection Control*; 1995; pp. 247-254.

McDysan et al.; *ATM Theory and Applications*, Chapter 15: Signaling and Routing in the Control Plane; 1999; pp. 405-410.

A.S. Tanenbaum; *Computer Networks*; 3$^{rd}$ ed., 1996; Chapter 5, pp. 450-455.

* cited by examiner

METHOD AND SYSTEM FOR COMMUNICATING WITH A VIRTUAL CIRCUIT NETWORK

CROSS-REFERENCE TO RELATED APPLICATION

This Application is a continuation of U.S. application Ser. No. 09/459,670, now U.S. Pat. No. 6,862,285, entitled "METHOD AND SYSTEM FOR COMMUNICATING WITH A VIRTUAL CIRCUIT NETWORK," filed on Dec. 13, 1999.

TECHNICAL FIELD

This invention relates generally to computer networking and, more particularly, relates to a method and system for communicating with a virtual-circuit network.

BACKGROUND OF THE INVENTION

New technologies such as Digital Subscriber Line (DSL) have enabled ordinary households and small businesses to obtain broadband access to powerful computer networks, such as the Internet, over ordinary telephone company lines. The advent of new virtual-circuit protocols has made high speed voice and video communication over broadband networks efficient and practical. Virtual-Circuit protocols allow the definition of a specific data path through a network using an identifier known as a "virtual circuit." While a datagram-based transport method such as an Internet Protocol (IP) packet is permitted to travel through a variety of network links, virtual-circuit packets are forced to travel over their designated virtual circuits. One popular virtual-circuit protocol is the Asynchronous Transfer Mode (ATM) protocol. The growing use of ATM has made the transmission of real-time movies and voice over large networks such as the Internet a reality. To enhance the consumer experience with ATM, the remote NETWORK DRIVER SPECIFICATION (NDIS) developed by MICROSOFT CORPORATION may include an ATM miniport which allows a personal computer to communicate with an ATM network. The remote NDIS is the subject of U.S. patent application Ser. No. 09/302,735 now U.S. Pat. No. 6,633,929 for a METHOD AND SYSTEM FOR ABSTRACTING NETWORK DEVICE DRIVERS, which is incorporated by reference herein in its entirety.

With the increasing demand for access to virtual circuit networks, many households and businesses will experience internal competition for the limited number of broadband data lines, and will therefore have to institute a system of connection sharing in order to take advantage of the new virtual-circuit-based protocols. Additionally, more and more ordinary devices, such as televisions and radios, are being adapted to use networks such as the Internet, thereby increasing the competition for the use of these data lines. Thus, it can be seen that there is a need for an improved method and system for communicating with a virtual-circuit network.

SUMMARY OF THE INVENTION

In accordance with this need, an improved method and system for communicating with a virtual-circuit network is provided, in which one or more calling devices in an internal network may communicate with a virtual-circuit network, such as an ATM network, via a proxy host.

According to the method, a host computer communicatively linked with a virtual circuit network and communicatively linked with a device (which may be a personal computer) over a local area network receives a virtual circuit message from the virtual circuit network, such as an asynchronous transfer mode network. A data structure associating a virtual circuit of the virtual circuit network with the device is referenced, and based on the association, the virtual circuit message is passed to the device over the local area network. The data structure may be a table containing an entry associating the virtual circuit with the device or with the network address of the device.

The system may comprise a proxy host computer. The proxy host computer may execute several programs, including a networking program for unwrapping a device message received from the virtual circuit network to extract a virtual circuit message; a call deflector program for determining an association between a device on a local area network to which the proxy host is linked and a virtual circuit of the virtual circuit network; and a packet switching program for passing the extracted virtual circuit message to the device over the local area network based on the determined association. The networking program may be a network device interface specification layer having an asynchronous transfer mode miniport.

The proxy host may also execute a bus driver for unwrapping a bus-specific message to extract a device message received from an interface device connected to the virtual circuit network.

In addition to the proxy host, the system may further comprise a plurality of devices communicatively linked to the proxy host over the local area network, wherein each of the plurality of devices may execute the networking program to unwrap a virtual circuit message received from the proxy host to extract data and pass the data to an application program, wherein the application program provides the data to a user at the device.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
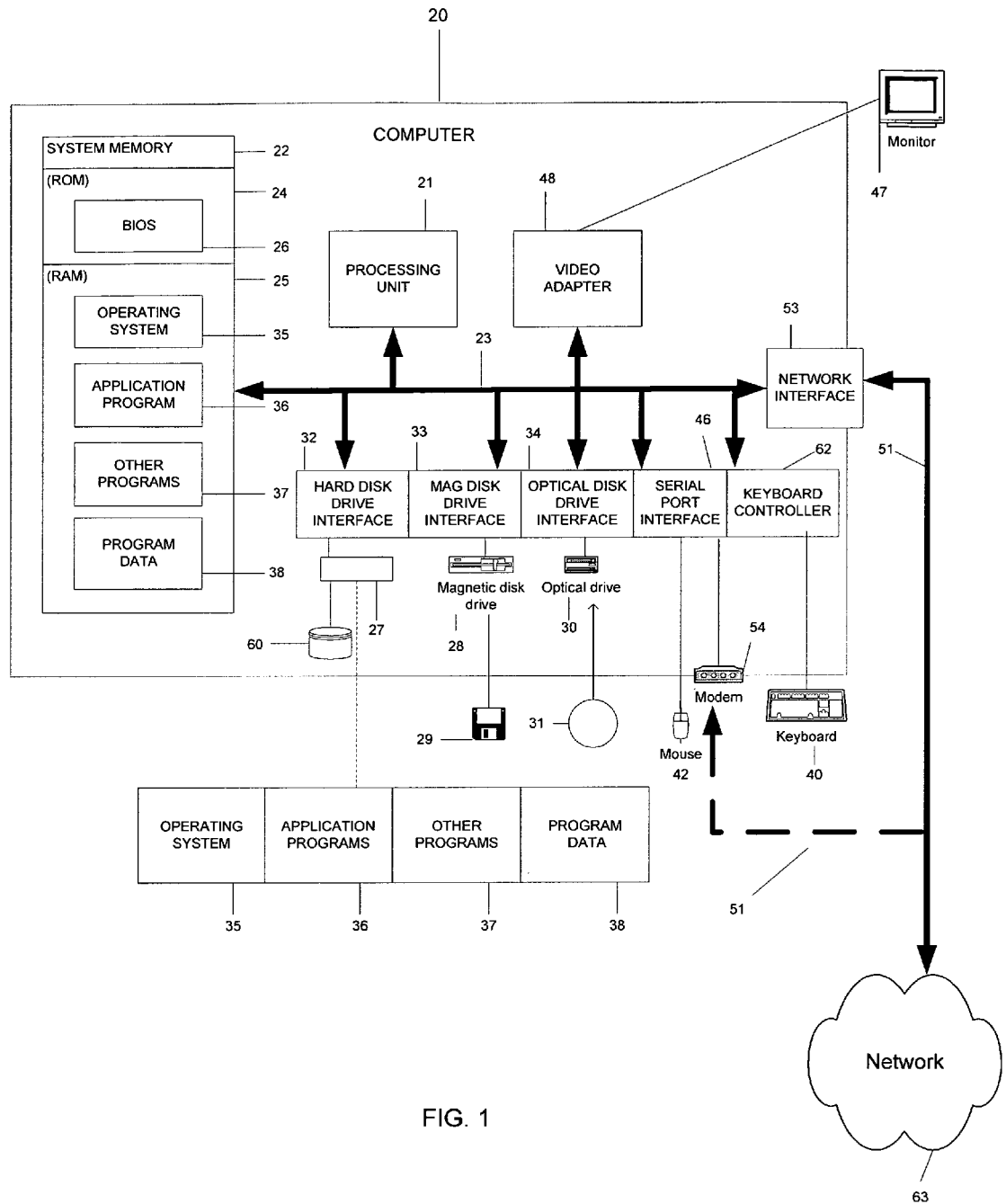
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as programs, being executed by a computer or similar device. Generally, programs include routines, other programs, objects, components, data structures, dynamic-linked libraries (DLLs), executable code, etc. that perform particular tasks or implement particular abstract data types. Moreover, those skilled in the art will appreciate that the term "computer" is not meant to limit the invention to personal computers, as the invention may be practiced on hand-held devices, multi-processor systems, microprocessor based or programmable consumer electronics, network devices, minicomputers, mainframe computers, and the like. The invention may also be practiced in distributed computing environments where tasks are performed by remote processing devices that are linked through a communications network. In a distributed computing environment, parts of a program may be located in both local and remote memory storage devices.

With reference to FIG. 1, an exemplary system for implementing the invention is shown. The system includes a general purpose computer in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory may include read only memory (ROM) 24 and random access memory (RAM) 25. A basic input/output system (BIOS) 26, containing the basic routines that help to transfer information between elements within the computer 20, such as during start-up, may be stored in the ROM 24. The computer 20 may further include a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

If included in the computer 20, the hard disk drive 27, magnetic disk drive 28, and optical disk drive 30 may be connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, programs and other data for the computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of programs may be stored on the hard disk 60, magnetic disk 29, optical disk 31, ROM 24 or RAM 25, including an operating system 35, one or more applications programs 36, other programs 37, and program data 38. A user may enter commands and information into the computer 20 through input devices such as a keyboard 40, which is typically connected to the computer 20 via a keyboard controller 62, and a pointing device, such as a mouse 42. Other input devices (not shown) may include a microphone, joystick, game pad, satellite dish, scanner, or the like. Input devices as well as peripheral devices may be connected to the processing unit 21 through a serial port interface 46 that is coupled to the system bus, a parallel port, game port, universal serial bus (USB), 1394 bus, or other interfaces. A monitor 47 or other type of display device is also connected to the system bus 23 via an interface, such as a video adapter 48. In addition to the monitor, computers typically include other devices not shown, such as speakers and printers.

The computer 20 may operate in a networked environment using logical connections to one or more devices within a network 63, including another personal computer, a server, a router, a network PC, a peer device or other common network node. These devices typically include many or all of the elements described above relative to the computer 20. The logical connections depicted in FIGS. 1 and 2 include one or more network links 51, for which there are many possible implementations, including a local area network (LAN) link and a wide area network (WAN) link. Such networking links are commonplace in offices, enterprise-wide computer networks, intranets and the Internet. It will be appreciated that the network connections shown are exemplary and other means of establishing a data path between the computers may be used. When used in a LAN, the computer 20 may be connected to the network 63 through a network interface or adapter 53. When used in a WAN, the computer 20 typically includes a modem 54 or other means for establishing communications over the network link 51, as shown by the dashed line in FIG. 1. The network link 51 may also be created over public networks, using technologies such as dial-up networking, the Internet, Digital Subscriber Line (DSL), Asynchronous Transfer Mode (ATM), Virtual Private Network (VPN) or any other conventional communication method. The modem 54 may be connected to the system bus 23 via the serial port interface 46, and may be external or internal. In a networked environment, programs depicted relative to the computer 20, or portions thereof, may be stored on other devices within the network 63.

In the description that follows, the invention will be described with reference to acts and symbolic representations of operations that are performed by one or more computers, unless indicated otherwise. As such, it will be understood that such acts and operations, which are at times referred to as being executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
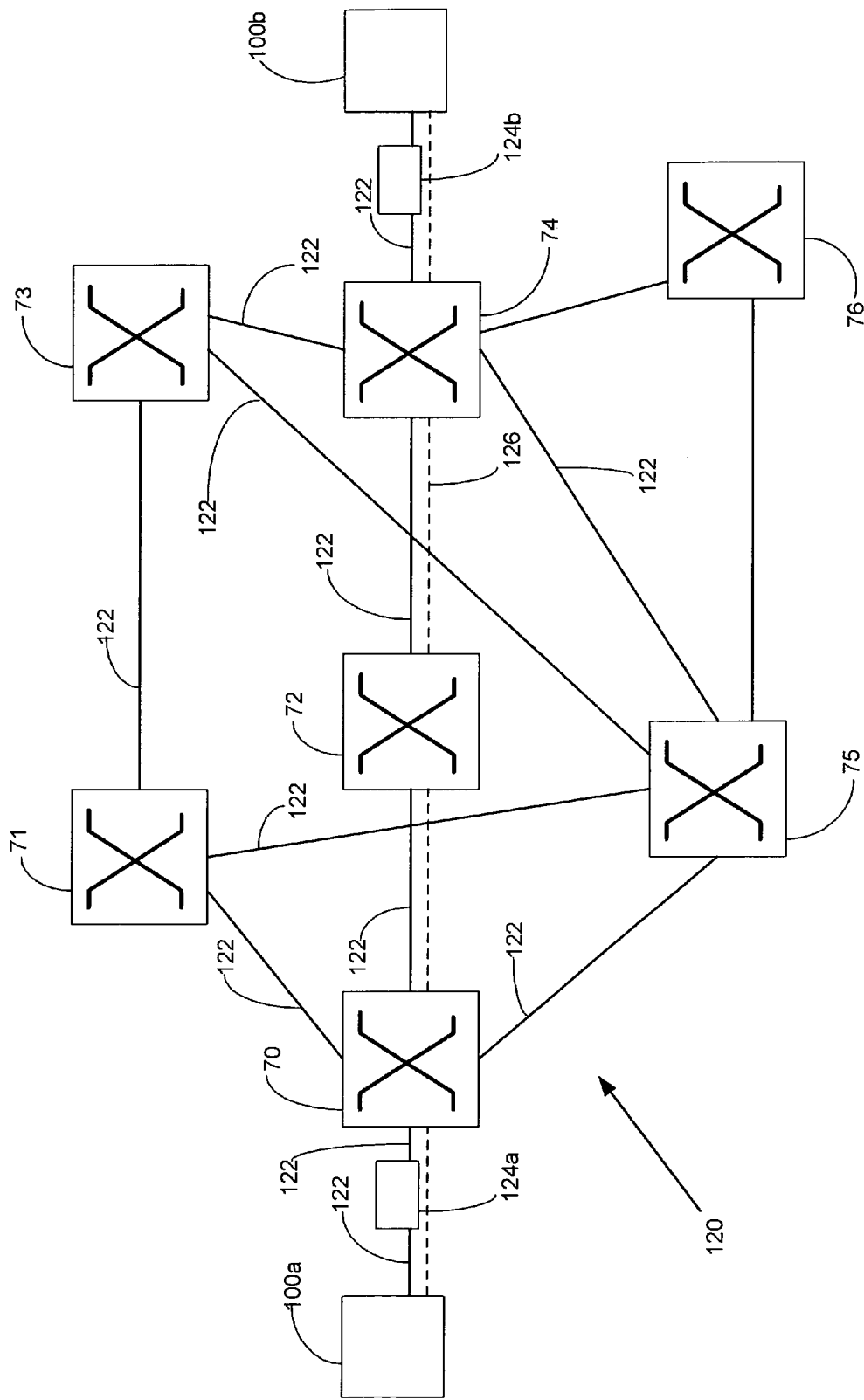
FIG. 2 is a block diagram illustrating an exemplary virtual circuit network over which a device may communicate in accordance with the invention.

The invention is generally directed to a method of communicating with a virtual circuit network, such as an ATM network 120 shown in FIG. 2. The ATM network 120 includes ATM switches 70-76 which are communicatively linked to one another by network links 122. Each switch 70-76 may include hardware and software for sending and receiving data. Each switch 70-76 has one or more ports, which may be logical or physical. Each port may have one or more virtual circuits associated with it. Each ATM cell has "virtual circuit" (VC) identifier to indicate the virtual circuit over which the cell is to travel. A VC is an abstract boundary between switch-based communication sessions, and as applied to ATM communication, generally represents the combination of an ATM "virtual path identifier" (VPI) and an ATM "virtual channel identifier" (VCI). Thus, an ATM message having a VPI of 3 and a VCI of 1 is said to be traveling "VC 3:1."

One or more computers, such as the computers 100a and 100b, may be linked to the network 120 via ATM interface devices 124a and 124b. The ATM interface devices 124a and 124b convert ATM cells into a standard networking format, such as USB, and vice versa, using an ATM driver. When an ATM call is placed from an originating computer 100a to a receiving computer 100b via the network 120, an ATM Setup signal is transmitted from the originating computer 100a to the ATM interface device 124a, which then transmits the ATM Setup signal over a VC conventionally designated for signaling (typically VC 0:5). The ATM Setup signal is then relayed among the switches 70-74 along a data path 126 until it reaches the ATM interface device 124b, which translates the ATM Setup signal into a format understandable by the receiving computer 100b. To accept the call, the computer 100b transmits an ATM Connect signal to the ATM interface device 124b, which transmits the ATM Connect signal back through the network 120 along the data path 126. As the acceptance signal travels back to the computer 100a, each switch along the way processes the acceptance signal by allocating a new virtual circuit to be used for all further ATM communication between the device 100a and the device 100b along that segment of the data path 126. For example, the switch 74 may allocate VC 0:35 for ATM communication between it and the device 100a and VC 0:34 for the ATM communication between it and the switch 72. Switch 72, in turn, may allocate VC 0:35 for the ATM communication between it and the switch 70. Finally, the switch 70 may allocate VC 0:33 for communication between it and the computer 100b.

To ensure that the communication between the device 100a and 100b travels over the correct VC's, each switch stores an entry that associates an input VC of an input port with an output VC on an output port. For example, it is assumed that the switch 74 of FIG. 2 has two ports: Port X, which is in communication with the device 100b, and Port Y, which is in communication with the switch 72. The switch 74 will have a table entry that associates VC 0:35 of Port X with VC 0:34 of Port Y, thereby indicating to the switch 74 that all traffic received on VC 0:35 of Port X is to be switched to VC 0:34 on Port Y for output and vice versa. When the call has concluded, one or both of the computers 100a and 100b transmits a termination signal over the network 120 and the switches 70-76 respond by deallocating the previously allocated VCs and deleting the corresponding table entries. In the case of a so-called "Permanent Virtual Circuit" (PVC), the data path 126 is permanently defined within the switches 70-76, in which case the initial setup and final deallocation processes need not occur.

Figure 3:
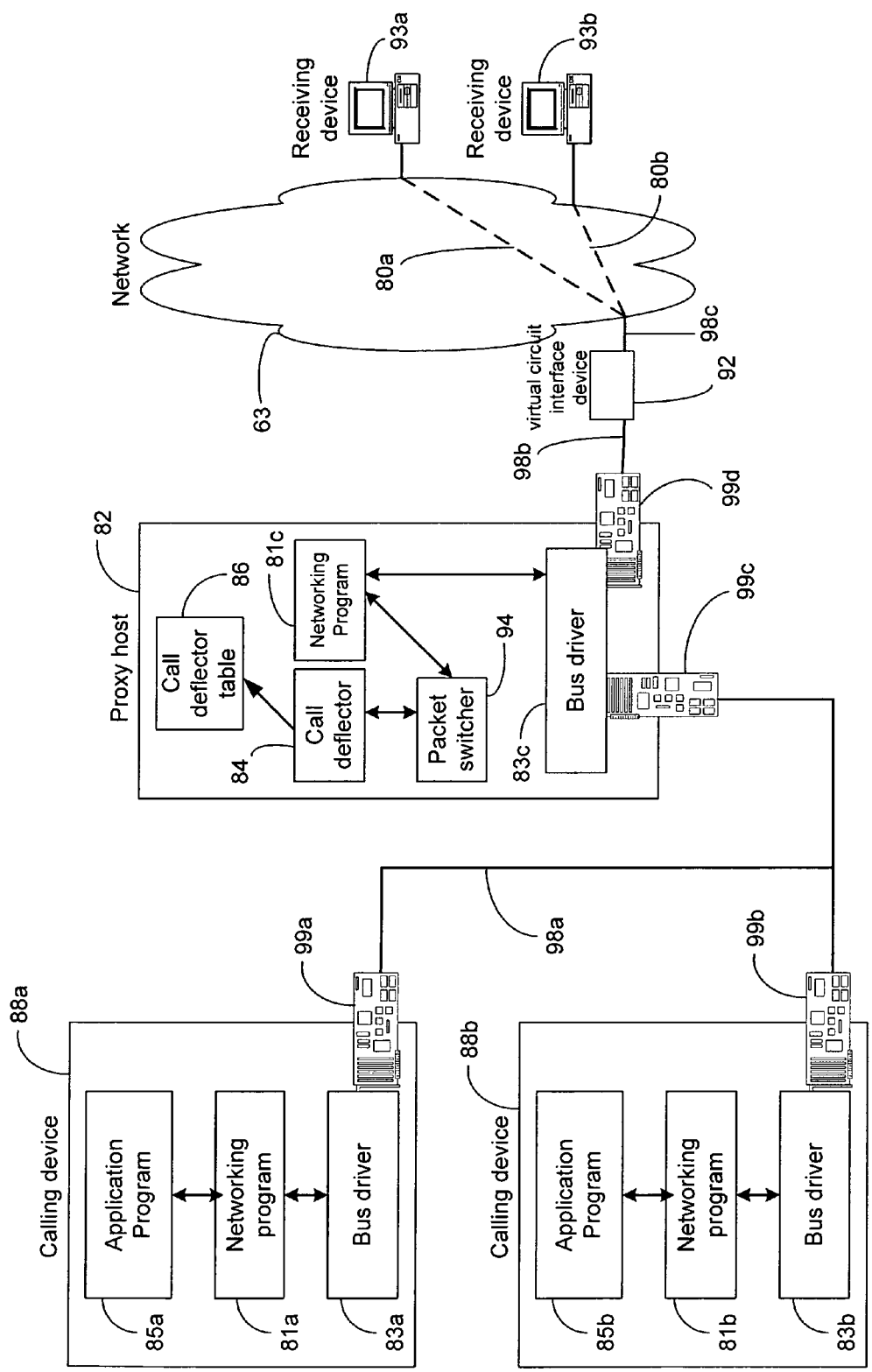
FIG. 3 is a block diagram of a network of calling devices and a proxy host configured in accordance with the invention.

In accordance with an embodiment of the invention shown in FIG. 3, calling devices 88a-88b, which may have many or all of the components of the computer 20 described in FIG. 1, are communicatively linked via network interface cards (NICs) 99a and 99b respectively to a network link 98a. The network link 98a is further linked to a proxy host 82 via a network interface card 99c. Although only two calling devices are shown, any number of calling devices is possible. The network link 98a is preferably a local area network link, such that the calling devices 88a-88b and the proxy host 82 comprise a local area network.

The proxy host 82 is communicatively linked to a virtual circuit interface device 92 via a network interface card 99d and a network link 98b. The virtual circuit interface device 92 may be implemented as an ATM-compatible Digital Subscriber Line (DSL) interface, and may include an ATM adaptation layer five (AAL 5). The virtual circuit interface device 92 is communicatively linked a virtual circuit network via a network link 98c. The virtual circuit network 63 may be an ATM network such as the ATM network 120 of FIG. 2. To aid in a description below of how communication occurs across the network 63, it will be assumed that a receiving device 93a and a receiving device 93b are also communicatively liked to the network 63.

The calling devices 88a and 88b may each execute application programs 85a and 85b, which may receive input from or provide output to a user. The application programs 85a and 85b may include one or more protocol programs such as a TCP/IP stack, an IP Over ATM (IPOA) protocol program and a Point-to-Point Protocol Over ATM (PPPOA) protocol program. The calling devices 88a and 88b may also execute networking programs 81a and 81b, which convert data into a standard format, hereinafter referred to as a device message, that can be interpreted by networking devices. Conversely, the networking programs 81a and 81b extract data from device messages received from networking devices. The process of inserting data having one format into a message having another format will hereinafter be referred to as "wrapping" the data. Performing the process in reverse (i.e. extracting data of one format from a message having another format) will hereinafter be referred to as "unwrapping" the data. These terms are also commonly used in conjunction with protocol layers, in which data may be wrapped into, for example, a transport layer, a networking layer, a data link layer and a physical layer.

In a preferred embodiment of the invention, the networking programs 81a and 81b are implemented as a NETWORK DRIVER INTERFACE SPECIFICATION (NDIS) abstraction layer having a User Network Interface (UNI) call manager and a remote NDIS ATM miniport. NDIS is a well-known standard defined by the MICROSOFT CORPORATION, which provides a universal set of OBJECT IDENTIFIERS (OIDs) which can be understood and used by any hardware device that is NDIS-compliant. An embodiment of NDIS having a remote NDIS extension is described in U.S. patent application Ser. No. 09/302,735 for a METHOD AND SYSTEM FOR ABSTRACTING NETWORK DEVICE DRIVERS, which is incorporated by reference herein in its entirety.

Referring again to FIG. 3, the calling devices 88a and 88b in the illustrated embodiment may each execute bus drivers 83a-83b respectively. The bus drivers 83a and 83b wrap outgoing data into a bus-specific message, such as an ethernet or USB frame for transmission over the network link 98a via the network interface cards 99a and 99b. Conversely, the bus drivers 83a and 83b may unwrap incoming messages to extract the underlying data or protocol layers. The bus drivers 83a and 83b are preferably implemented as network specific microports which are described in previously-referenced patent application.

The proxy host 82 of the illustrated embodiment may execute a networking program 81c and a bus driver 83c, which may have the same functions and possible embodiments as the networking programs 81a-81b and bus drivers 83a-83b. Additionally, the proxy host 82 may execute a call deflector program 84 to keep track of which virtual circuit, if any, has been assigned by the virtual circuit network 63 to one or more of the calling devices 88a-88b by maintaining entries in a call deflector table 86. Each entry associates a calling device with its assigned VC. The call deflector program 86 provides this information to a packet switcher program 94, which may also be executed by the proxy host 82. Based on the information provided by the call deflector program 84, the packet switcher program 94 links the input and output signals of the calling devices 88a and 88b with corresponding input and output device and the network 63, virtual circuit cells traveling through the host 84 are passed to their appropriate destinations.

To illustrate how communication occurs between devices over a virtual circuit network in accordance with the present invention, reference is made to FIG. 3 and the following example, in which concurrent virtual circuit calls are made from the calling devices 88a and 88b. It is assumed in this example that the calling device 88a makes the first virtual circuit call to the receiving device 93a, followed by a second virtual circuit call from the calling device 88b to the receiving device 93b. It is also assumed that the virtual circuit interface device 92 is capable of sending, receiving and interpreting the device messages of the networking programs 81a-81c. In a remote NDIS implementation, the interface device 92 would be known as "Remote NDIS compliant."

The application program 85a on the calling device 88a sends a request for a virtual circuit connection to the networking program 81a. The request may include the destination address of the receiving device 93a. The networking program 81a generates a virtual circuit "Setup" cell which may include the destination address of the receiving device 93a, wraps the cell into a device message, such as a remote NDIS OID, inserts the network address of the calling device 88a into the device message, and sends the device message to the bus driver 83a. The bus driver 83a wraps the device message into a bus-specific message, such as an Ethernet or USB frame, and sends the bus-specific message over the network link 98a via the NIC 99a to the NIC 99c on the proxy host 82.

At the proxy host 82, the bus driver 83c receives the bus-specific message from the NIC 99a, extracts the device message from the bus-specific message and sends the device message to the networking program 81c. The networking program 81c reads the network address (of the calling device 88a) from the device message and extracts the virtual circuit cell from the device message. The networking program 81c passes the virtual circuit cell to the packet switcher program 94 along with the network address of the originating device (calling device 88a).

The packet switcher program 94 relays the virtual circuit cell and the originating network address to the call deflector program 84. In response to receiving this information, the call deflector program 84 examines the originating network address of the device message, generates a call reference value to uniquely identify the calling device 88a for the duration of this call, and makes an entry in the call deflector table 86 associating that call reference value with the network address of the calling device 88a. The use of call reference values in conjunction with virtual circuit protocols is well-known. The call deflector program 84 also inserts the generated call reference value into the header of the virtual circuit cell.

The call deflector program 84 then passes the virtual circuit cell to the packet switcher program 94, which passes the virtual circuit cell to the networking program 81c. The networking program 81c wraps the virtual circuit cell into a device message, such as a remote NDIS OID, and passes the device message to the bus driver 83c. The bus driver 83c wraps the device message into a bus-specific format, such a USB frame. The bus-specific message is transmitted out through the network link 98b to the virtual circuit interface device 92. The virtual circuit interface device 92 transmits the virtual circuit cell to the network 63 over the network link 98c in the appropriate physical format, such as DSL.

The virtual circuit cell is relayed through a series of switches, for example, the ATM switches 70-74 of the ATM network 120 of FIG. 2, to the receiving device 93a. The receiving device 93a will respond with a virtual circuit Connect cell sent back through the network 63. At each switch along way, a virtual circuit will be assigned for communication between the receiving devices 93a and 93b, thereby creating a data. path 80a through the network 63. The virtual circuit "Connect" cell contains the virtual circuit number to be used in further communications by the requesting device (calling device 88a).

The virtual circuit interface device 92 receives the virtual circuit "Connect" cell and wraps it into device message, such as a remote NDIS "create virtual circuit" OID and sends the device messages over the network link 98b wrapped into a bus-specific message, such as a USB frame. The bus-specific message travels through the bus driver 83c, in which the device message is extracted from the bus frame and passed to the networking program 81c. The networking program 81c unwraps the device message, extracts the virtual circuit "Connect" cell, and passes the virtual circuit "Connect" cell to the packet switcher program 94.

The packet switcher program 94 then relays the "Connect" cell to the call deflector program 84. The call deflector program 84 reads the virtual circuit assignment and the call reference value from the "Connect" cell, correlates the call reference value with the network address of the calling device 88a, and based on that correlation, makes an entry in the table 86 that associates the network address of the calling device 88a with the assigned virtual circuit. The packet switcher program 94 sends the virtual circuit "Connect" cell to the networking program 81c which rewraps the cell into a device message, such as a remote NDIS OID, and sends the device message to the bus driver 83c. The bus driver 83c wraps the device message into a bus-specific message and sends it to the calling device 88a.

When the bus-specific message reaches the calling device 88a, the bus driver 83a unwraps it and extracts the device message. The bus driver 83a passes the device message to the networking program 81a, which unwraps the device message (e.g. by interpreting a remote NDIS OID), and extracts the virtual circuit "Connect" cell. The networking program 81a recognizes the virtual circuit "Connect" cell as being a response to the virtual circuit request, and stores the value of the assigned virtual circuit in a data structure for use during the subsequent virtual circuit call. The networking program 81a then notifies the application program 85a that the virtual circuit call may proceed.

The application program 85a may then begin passing data to the networking program 81a for transmission to the receiving device 93a during the virtual circuit call. The networking program 81a may create virtual circuit data cells containing the data received from the application program 85a and insert the correct virtual circuit number into the headers of the virtual circuit data cells, so that the cells will be appropriately transmitted across the network 63 to the receiving device 93a.

From this point forward, the packet switcher program 84 will relay virtual circuit data cells originating from the calling device 88a to the virtual circuit network 63. Furthermore, when the proxy host 82 receives incoming virtual circuit cells from the network 63, the call deflector program 84 will reference the call deflector table 86, correlate the network address of the calling device 88a with the virtual circuit of the incoming cells, and pass the virtual circuit cells received from the network 63 on that virtual circuit to the packet switcher program 94 for transmission to the calling device 88a based on that correlation. The entry in the call deflector table 86 will persist until a "Release" message is generated by the calling device 88a or the network 63. The entry may then be deleted.

While the communication between the calling device 88a and receiving device 93a is still occurring, the calling device 88b may place a call to the receiving device 93b by performing the steps described above as well. During the call setup, the call deflector program 84 assigns a call reference value to the calling device 88b that is distinct from that assigned to the calling device 88a. The network 63 assigns a virtual circuit to that call as well, thereby creating a data path 80b over the network 63 to the receiving device 93b. The call deflector program 84 will create an entry it the call deflector table 86 that associates the assigned virtual circuit with the calling device 88b. From that point on, the calling device 88a and the calling device 88b will each have their own virtual circuit over which to communicate with the network 63, and the packet switcher program 84 will cause the packet switcher program 94 to switch table 86. Thus, from the point of view of the application programs 85a and 85b, the proxy host 82 appears as if it was the ATM interface device 92. This allows the application programs 85a and 85b to communicate with the network 63 as if they were connected directly to it.

One or more application programs (not shown) executing on the proxy host 82 may make virtual circuit calls in parallel with one or more of the calling devices linked to the proxy host 82. When an application program on the proxy host 82 makes a virtual circuit call, an entry may be created in the call deflector table 86 in the same manner as described above with respect to the calling device 88a.

It can be seen from the foregoing description that a novel method of communicating with a virtual circuit-based network has been provided. In view of the many possible embodiments to which the principles of this invention may be applied, it should be recognized that the embodiment described herein with respect to the drawing figures is meant to be illustrative only and should not be taken as limiting the scope of invention.

Those of skill in the art will recognize that the software components which are depicted in FIGS. 1-3 as labeled boxes are meant to be exemplary only. Each box may represent a single program, or a group of programs. It will also be understood that although a software component may be illustrated as a single box, it may, in reality, be comprised of user-mode components as well as kernel-mode components. Also, the arrows drawn between the various software components (boxes) are not meant to be exclusive, as many of these components may communicate with components that are not shown.

Furthermore, elements of the illustrated embodiment shown in software may be implemented in hardware and vice versa. The illustrated embodiment may also be modified in arrangement and detail without departing from the spirit of the invention. Therefore, the invention as described herein contemplates all such embodiments as may come within the scope of the following claims and equivalents thereof.

We claim:

1. A method for a host computer communicatively linked to a local area network and a virtual circuit interface device to act as a proxy between devices on the local area network and devices on a virtual circuit network, the method comprising the steps of
    receiving a first request from a first application running on a first local area network device to set up a first virtual circuit connection with a first virtual circuit network device;
    passing the first request to the first virtual circuit network device;
    receiving a first answer from the first virtual circuit network device that includes a first virtual circuit identification;
    storing a first mapping between a first network address of the first local area network device and the first virtual circuit identification in a table;
    receiving a second request from a second application running on a second local area network device to set up a second virtual circuit connection with a second virtual circuit network device;
    passing the request to the second virtual circuit network device;
    receiving a second answer from the second virtual circuit network device that includes a second virtual circuit identification;
    storing a second mapping between a second network address of the second local area network device and the second virtual circuit identification in the table; and
    using the table to map data received through the virtual circuit interface device to the first local area network device and the second local area network device.

2. The method according to claim 1, wherein the virtual circuit network is an asynchronous transfer mode network.

3. The method according to claim 1, wherein the table is a call deflector table.

4. The method according to claim 1, wherein the host communicates with the virtual circuit interface device through a network interface card.

5. The method according to claim 1, wherein the host facilitates sharing of the virtual circuit interface device between the first application and the second application.

6. A system comprising:
    a host computer connected to a first device via a local area network (LAN) and connected to a virtual circuit interface device that interfaces with a virtual circuit network, the host computer acting as a proxy between the first device on the local area network and a second device on the virtual circuit network, the host computer comprising:
        a network program extracting a virtual circuit message from a device message, wherein the virtual circuit message includes a call reference value and a virtual circuit identification assigned to the first device on the local area network for a virtual circuit connection with the second device on the virtual circuit network;
        a call deflector program storing in a table a mapping between a network address on the LAN of the first device and the virtual circuit identification, wherein the mapping is stored in the table and is usable by the host to mediate communications between the first device and the second device and wherein the table further includes at least one additional mapping between at least one network address on the LAN of at least one additional device and at least one additional virtual circuit identification; and
        a packet switching program for extracting information indicating the virtual circuit identification from a virtual circuit data cell received over the virtual circuit network from the second device, identifying the network address on the LAN of the first device based on the information indicating the virtual circuit identification and the mapping, and passing the virtual circuit data cell to the first device using the identified network address on the LAN of the first device, wherein the packet switching program relays virtual circuit data cells originating from the first device to the virtual circuit network without reference to the mapping.

7. The system according to claim 6, further comprising a bus driver extracting the device message from a bus-specific message, and passing the device message to the network program.

8. The system according to claim 6, wherein the virtual circuit network is an asynchronous transfer mode network.

9. The system according to claim 6, wherein each mapping in the table associates a network address of one of plural devices on the LAN with an identifier of a respective one of plural virtual circuit connections.

10. The system according to claim 9, wherein the plural virtual circuit connections are accessed by the host computer through the virtual circuit interface device.

11. The system according to claim 6, wherein the packet switching program is further configure for relaying virtual circuit data cells from the first device onto the virtual circuit network through the virtual circuit connection identified by the respective virtual circuit data cell.

12. A computer-readable medium having computer-executable instructions that, when executed by a host computer communicatively linked to a local area network and a virtual circuit interface device to act as a proxy between devices on the local area network and devices on a virtual circuit network, perform a method, the method comprising acts of:
receiving a first request from a first application running on a first local area network device to set up a first virtual circuit connection with a first virtual circuit network device;
passing the first request to the first virtual circuit network device;
receiving a first answer from the first virtual circuit network device that includes a first virtual circuit identification;
storing a first mapping between a first network address of the first local area network device and the first virtual circuit identification in a table;
receiving a second request from a second application running on a second local area network device to set up a second virtual circuit connection with a second virtual circuit network device;
passing the request to the second virtual circuit network device;
receiving a second answer from the second virtual circuit network device that includes a second virtual circuit identification;
storing a second mapping between a second network address of the second local area network device and the second virtual circuit identification in the table; and
using the table to map data received through the virtual circuit interface device to the first local area network device and the second local area network device,
wherein the computer-readable medium is not a propagating signal.

13. The computer-readable medium according to claim 12, wherein the virtual circuit network is an asynchronous transfer mode network.

14. The computer-readable medium according to claim 12, wherein the table is a call deflector table.

15. The computer-readable medium according to claim 12, wherein the host communicates with the virtual circuit interface device through a network interface card.

16. The computer-readable medium according to claim 12, wherein the host facilitates sharing of the virtual circuit interface device between the first application and the second application.

17. A method for a host computer communicatively linked to a local area network and a virtual circuit interface device to act as a proxy between devices on the local area network and devices on a virtual circuit network, the method comprising the steps of:
receiving a first request from a first application running on a first local area network device to set up a first virtual circuit connection with a virtual circuit network device;
passing the first request to the first virtual circuit network device;
receiving a first answer from the first virtual circuit network device that includes a first virtual circuit identification;
storing a first mapping between a first network address of the first local area network device and the first virtual circuit identification in a call deflector program containing a table, the table mapping between a network address of the first device and the virtual circuit identification, wherein the mapping is stored in the table and is usable to mediate communications between the first device and the second device;
receiving a second request from a second application running on a second local area network device to set up a second virtual circuit connection with the virtual circuit network device;
passing the second request to the second virtual circuit network device;
receiving a second answer from the second virtual circuit network device that includes a second virtual circuit identification;
storing a second mapping between a second network address of the second local area network device and the second virtual circuit identification in the table; and
using the table to map data received through the virtual circuit interface device to the first local area network device and the second local area network device,
wherein the host facilitates sharing of the virtual circuit interface device between the first application and the second application.

* * * * *